United States Patent Office 3,078,309
Patented Feb. 19, 1963

3,078,309
PREPARATION OF ORGANOBORON COMPOUNDS
Herbert C. Brown, 1840 Garden St., West Lafayette, Ind.
No Drawing. Filed Nov. 6, 1959, Ser. No. 851,264
6 Claims. (Cl. 260—606.5)

This invention relates to the preparation of organoboron compounds by reaction of diborane, $B_2H_6$, with dienes. This application is a continuation-in-part of my copending application Serial No. 680,934 filed August 29, 1957.

Hurd (J. Am. Chem. Soc. 70, 2053 (1938)) reported that the reaction of diborane with substantial excesses of certain mono-olefinic hydrocarbons—by heating of the two reactants under pressure in sealed tubes at elevated temperatures for extended periods of time—formed certain trialkyl boranes. The complexity and difficulty of the reaction led Hurd to suggest that the reaction of diborane with olefins would incur sharp difficulties if relatively large amounts of diborane were used.

It has now been found that relatively large amounts of diborane can be used in reaction between dienes and diborane to produce bis-hydroborated products.

Accordingly, an object of this invention is to provide a novel process of preparing bis-hydroboration products. Another object is to provide an elegant means whereby bis-hydroborated products are formed by bringing together dienes and relatively large amounts of diborane. A further object is to provide novel and exceedingly useful diene bis-hydroboration products. Other important objects of this invention will become apparent from the ensuing description.

Provided by this invention is a process for the preparation of organoboron compounds characterized by reacting diborane with a diene in relative amounts such that there is present from about 0.25 to about 0.75 mole of diborane per mole of diene. In other words, the reactants are fed into the reaction zone in quantities such that there are only from about 1.3 to about 4 moles of diene per mole of diborane.

Formed by the process of this invention are bis-hydroborated dienes. Thus, the boron hydride groups of the diborane add to the double bonds of the diene to form the bis-hydroborated products. The organoboron products therefore contain at least 2 boron-carbon bonds per diene molecule.

Among the features and advantages of the process of this invention is the fact that a relatively large amount of diborane is used. This leads to a very easily controlled rapid reaction to form the bis-hydroborated products. In fact, these novel products are formed in excellent yields; in many cases the yields are quantitative. Moreover, the bis-hydroborated dienes are exceedingly valuable chemical products. For example, they can be effectively used as antioxidants and antisludging agents in engine and industrial oils. In addition these bis-hydroborated dienes are excellent chemical intermediates which can be used, even without separation and isolation, in the formation of diols.

The process of this invention is preferably conducted in the liquid phase. In this embodiment use can be made of an inert solvent, or of a previously prepared portion of the bis-hydroborated diene itself, or of a liquid phase comprising an adsorbed liquid phase utilizing an appropriate adsorbent such as finely divided activated charcoal.

A particularly preferred embodiment of this invention is to conduct the above process in the liquid phase and in the presence of a catalyst. This catalyst is a weak Lewis base of the type capable of forming unstable complexes with Lewis acids such as diborane and boron trifluoride. The catalyst may be present in comparatively small amounts, even as a trace.

The diborane reactant can be preformed and therefore be introduced into the reaction zone as such, or it can be prepared in situ. A number of appropriate procedures are available for preparing diborane either in advance of the reaction or by generation in situ. For example, addition of a solution of sodium borohydride in diethylene glycol dimethyl ether to boron trifluoride etherate forms gaseous diborane which can be led into the hydroboration reactor containing the diene. Alternatively, boron trifluoride etherate can be added directly to the hydroboration reactor containing diene and sodium borohydride to form the diborane reactant in situ.

Examples of the dienes which can be effectively used in the process of this invention are propadiene (allene), butadiene, isoprene, piperylene, pentadiene-1,4, cyclopentadiene, methylcyclopentadiene, hexadiene-1,5, cyclohexadiene, bicycloheptadiene, α-terpinene, methyl linoleate, chloroprene, and other similar open chain or cyclic, conjugated or unconjugated dienes. It is seen that these dienes may bear certain functional groups which are not significantly reduced by diborane under the reaction conditions. Thus the dienes include nitro-substituted dienes, halo-substituted dienes, diene ethers, diene acid chlorides, diene carboxylic esters, diene borate esters, and the like. Most preferred diene reactants are diene hydrocarbons containing from 4 to about 40 carbon atoms in the molecule, most especially conjugated diene hydrocarbons containing 4 to about 20 carbon atoms.

The process of this invention can be effectively conducted at temperatures ranging from about $-40°$ C. to about 100° C. It is preferably to conduct the reaction at temperatures ranging from about 0° to about 40° C. Under these latter conditions reaction proceeds very smoothly and very rapidly, and there is no need to burden the reaction equipment with extensive heating and/or cooling facilities.

Another feature of this invention is that when conjugated dienes are used as a reactant the amount of diborane charged to the reaction zone can be somewhat less than described above without sacrificing the numerous advantages of this invention. Thus, bis-hydroboration occurs in very good yield according to this invention with down to about 0.2 mole of diborane per mole of diene when the diene is conjugated.

This invention will be still further understood by reference to the following examples in which all parts and percentages are by weight unless otherwise specified.

*Example I*

Into a reaction vessel equipped with reagent-introducing means and temperature-regulating means were placed 70 parts by volume of tetrahydrofuran and 10.8 parts of 1,3-butadiene. Diborane was generated in situ by the addition of sodium borohydride (4.18 parts) as a one-molar solution in diglyme

to a solution of boron trifluoride etherate in diglyme. Hence, the reaction vessel contained 0.366 mole of diborane per mole of butadiene. The reaction was allowed to proceed at room temperature (approx. 25° C.) and led to an essentially quantitative yield of bis-hydroborated butadiene. Characterization of this product was effected by oxidizing the same by careful addition of hydrogen peroxide at 0° C. while keeping the pH slightly alkaline. 42 parts by volume of hydrogen peroxide as a 30 percent aqueous solution was used as the oxidant. The reaction mixture was then allowed to warm up to room temperature and the liquid decanted from the precipitate. Evaporation of the solvent gave a residue which was extracted with tetrahydrofuran, and the extract was allowed to stand at 0° C. for about 16 hours. The precipitate formed was filtered off, and the filtrate was concentrated under vacuum. Distillation gave 14.8 parts of a liquid (boiling point 70–80° C. at 0.5 mm. Hg). Analysis of the distillate showed that the main products were 1,4-butanediol (80 percent) and 1,3-butanediol (20 percent).

*Example II*

Freshly distilled 1,5-hexadiene (8.2 parts; 0.1 mole) was placed in a reaction vessel containing 50 parts by volume of tetrahydrofuran. Diborane (0.924 parts; 33 millimoles) formed by external generation from sodium borohydride was charged into the resultant liquid mixture. Hence, the mole ratio of diborane to diene was 0.33. Bis-hydroboration occurred readily at room temperature with the resultant formation of an essentially quantitative yield of bis-hydroborated product of 1,5-hexadiene in less than 1 hour. This product was characterized by diluting the reaction mixture with 3N aqueous sodium hydroxide and oxidizing the reaction product by careful addition of 21 parts by volume of 30 percent aqueous hydrogen peroxide. The reaction mixture was then allowed to stand at 0° C. for about 16 hours and the precipitate which formed was separated by filtration. The filtrate was concentrated under reduced pressure and the concentrate was extracted with tetrahydrofuran. Distillation of the extract gave 9.3 parts of a liquid, B.P. 105–108° C. at 0.7–0.5 mm. Hg. This liquid crystallized on standing. Recrystallization of the same from ethanol-ether gave 1,6-hexanediol, M.P. 40–43° C. This product when mixed with pure, synthetic 1,6-hexanediol showed no melting point depression.

*Example III*

To illustrate the propensity toward bis-hydroboration, an excess of butadiene (0.1 mole) was dissolved in 70 ml. diglyme. To this was added a quantity of diborane (0.018 mole, generated by addition of 0.027 mole $NaBH_4$ to $BF_3$-etherate in diglyme) theoretically sufficient to react with only one double bond per butadiene molecule. However, after the hydroboration reaction, 42 percent of the butadiene was shown to be unreacted by means of gas chromatography analysis. On oxidation and hydrolysis, as in Example I, 8 to 10 percent yields of allyl carbinol were detected by gas chromatography among the products, indicating that under these conditions approximately 80 percent of the available B-H bonds react by bis-hydroboration.

*Example IV*

Using 50 parts of diglyme as reaction solvent, 6.8 parts (0.1 mole) of piperylene (pentadiene-1,3) and 2.1 parts (0.073 mole) of diborane—generated as in Example I—are brought together. Reaction ensues at room temperature leading to an essentially quantitative yield of bis-hydroborated pentadiene-1,3. This bis-hydroborated product is then subjected to oxidation and hydrolysis as described in Example I. Formed is an excellent yield of a mixture of pentanediol-1,3 and pentanediol-1,4.

*Example V*

Combined in a reaction vessel are 6.6 parts (0.1 mole) of cyclopentadiene and 70 parts of toluene. This combination is cooled to 0° C. and then 2.1 parts (0.073 mole) of diborane is introduced into the mixture. This diborane is externally generated as in Example II. The resultant mixture is then allowed to slowly warm up to 25° C. and to stand for 72 hours. The resultant bis-hydroborate of cyclopentadiene is then oxidized and hydrolyzed in accordance with the procedure of Example I. The final product is cyclopentanediol-1,3.

*Example VI*

Mixed together are 6.8 parts (0.1 mole) of isoprene (2-methylbutadiene-1,3) and 70 parts of n-octane (dried by distillation from sodium borohydride). Into this system is passed 2.1 parts (0.073 mole) of diborane formed from external generation as in Example II with the temperature being 0° C. The temperature is then allowed to rise to 25° C. Gas chromatography analysis of small aliquots of the reaction mixture shows that hydroboration is proceeding slowly. Next, 1 part of diglyme is added to the reaction mixture. At this point, gas chromatography analysis for disappearance of isoprene shows that hydroboration is rapid and is complete within 2 hours at room temperature. Therefore, an essentially quantitative yield of bis-hydroborated isoprene is formed. This product is then oxidized and hydrolyzed using the procedure of Example I. The resultant product is shown by gas chromatography to be largely 2-methylbutanediol-1,4 with smaller amounts of 2-methylbutanediol-1,3 and 3-methylbutanediol-1,3 being co-present.

*Example VII*

A diborane (4.2 parts; 0.146 mole) solution is formed by the addition of sodium borohydride to a solution of boron trifluoride etherate in triglyme

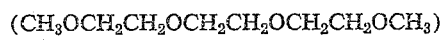

In all, 70 parts of triglyme is used. The resultant triglyme-diborane solution is cooled to 0° C. Into this solution is passed 8.0 parts (0.2 mole) of gaseous allene (propadiene). Upon completion of the addition, the system is allowed to slowly warm to room temperature. The reaction product is the bis-hydroborate of allene which is formed in essentially quantitative yield. This product is then oxidized and hydrolyzed utilizing the procedure of Example I. The final product is shown by gas chromatography to be chiefly propanediol-1,3 with a lesser quantity of propanediol-1,2 being co-present.

*Example VIII*

The procedure of Example I is repeated using 25.5 parts (0.1 mole) of octadecadiene-6,9, 2.1 parts (0.073 mole) of diborane, and 100 parts of diglyme as reaction solvent. The bis-hydroborated octadecadiene-6,9 is converted into a mixture of octadecanediols upon oxidation and subsequent hydrolysis using the technique of Example I.

*Example IX*

The procedure of Example II is repeated using 8.9 parts (0.1 mole) of chloroprene (2-chlorobutadiene-1,3), 2.1 parts (0.073 mole) of diborane, and 70 parts of tetrahydrofuran. An excellent yield of bis-hydroborated chloroprene is formed. Upon oxidation and hydrolysis according to the procedure of Example I, the product is found upon gas chromatography analysis to be composed largely of 2-chlorobutanediol-1,4 with a smaller amount of 2-chlorobutanediol-1,3.

As pointed out above, a preferred embodiment of this invention is to conduct the present process in the liquid phase.

Among the inert solvents which can be used as the liquid phase in which the reaction is conducted are hydrocarbon solvents which can be aliphatic or aromatic or halogenated hydrocarbons, e.g. n-pentane, n-heptane, petroleum hydrocarbon solvents, benzene, toluene, xylene, chlorobenzene, ethylene dichloride, etc.

Another preferred procedure is to utilize the liquid bis-hydroborated diene to provide the liquid phase. Thus, for example, 1,3-butadiene and diborane in appropriate ratio can be passed into bis-hydroborated butadiene (previously prepared) and the product bis-hydroborated butadiene withdrawn at the same rate in which the reactants are fed into the reation zone.

As was pointed out above, a particularly preferred form of this invention is to utilize a catalyst in conjunction with the liquid phase.

To illustrate the type of materials which may be used as catalysts the following examples are offered, but it should be understood that these examples are illustrative only and are not to be construed as limiting:

(A) Ethers, e.g. ethyl ether, tetrahydrofuran, diglyme ($CH_3OCH_2CH_2OCH_2CH_2OCH_3$), anisole ($CH_3OC_6H_5$), diisopropyl ether, phenatole.

(B) Organic esters, e.g. ethyl acetate, ethyl benzoate.

(C) Inorganic esters, e.g. trimethyl borate $$[B(OCH_3)_3]$$

triethyl borate, triisopropyl borate, ethyl silicate.

(D) Sulfur derivatives, e.g. ethyl sulfide, methyl ethyl sulfide, diethyl sulfone, tetrahydrothiophene.

(E) Nitro derivatives, e.g. nitromethane, nitrobenzene.

As can be seen from these examples, the materials which can be used as catalysts in the present invention are weak donor molecules or weak Lewis bases which are capable of forming unstable complexes or addition compounds with Lewis acids such as diborane and boron fluoride. While any group VI atom could be present in the weakly basic organic compound catalyst, preferably the catalyst will contain oxygen or sulfur. Even water or alcohols can be used as a catalyst, but they react with diborane to form boric acid or boric acid esters and hydrogen and thus involve a loss of diborane.

The catalyst may be introduced into the reaction mixture with either of the reactants, i.e., it may be passed in with the diborane gas or it may be admixed with the diene.

The bis-hydroborated dienes formed so elegantly by the process of this invention are especially suitable for use as chemical intermediates in the formation of valuable chemical products. Thus, as demonstrated in Examples I, II, and IV–IX inclusive, the bis-hydroborated dienes can be chemically oxidized to form a tremendous variety of diols.

What is claimed is:

1. A process for the preparation of bis-hydroborated compounds characterized by reacting diborane with a diene in relative amounts such that there is from about 0.25 mole to about 0.75 mole of diborane per mole of diene; said reaction being conducted in the presence of a small amount of a weak Lewis base catalyst capable of forming unstable complexes of diborane; said reaction also being conducted at a temperature between about −40 to 100° C.; said diene being selected from the group consisting of hydrocarbon dienes, nitro-substituted dienes, halo-substituted dienes, diene ethers, diene acid chlorides, diene carboxylic esters, and diene borate esters.

2. The process of claim 1 further characterized in that the reaction is conducted in the liquid phase.

3. The process of claim 1 further characterized in that the reaction is conducted at a temperature between about 0 to 40° C.

4. The process of claim 1 further characterized in that said weak Lewis base catalyst is an ether.

5. The process of claim 1 further characterized in that said reaction is conducted in the liquid phase at a temperature between about 0 to 40° C.

6. The process of claim 1 further characterized in that said diene is butadiene and the reaction is conducted in the presence of tetrahydrofuran at a temperature between about 0 to 40° C.

References Cited in the file of this patent

UNITED STATES PATENTS 2,964,567 Neff _____ Dec. 13, 1960
2,977,389 DeLorenzo _____ Mar. 28, 1961

OTHER REFERENCES

Brown et al.: J. Org. Chem., vol. 22, pp. 1136–7 (1957).

Zaslowsky et al.: Current Literature Abstracts Bulletin, vol. 7, page 22 (August 1958).